May 1, 1923.
E. H. COOK
1,453,546
TABLE SLIDE CONSTRUCTION
Filed Feb. 6, 1922
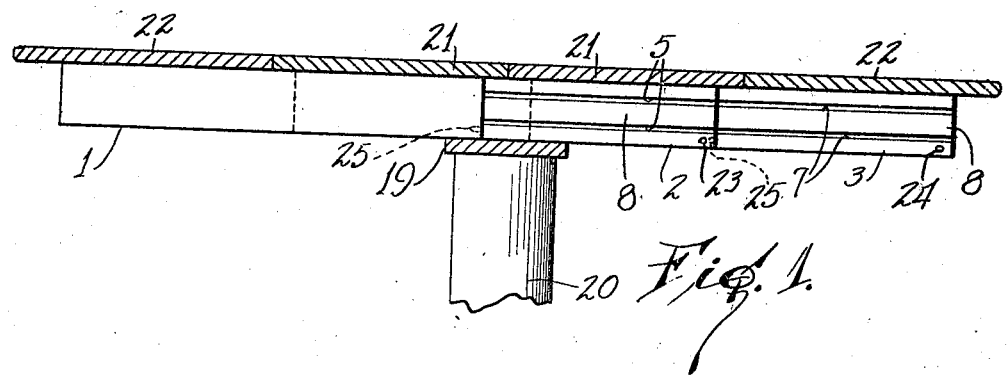
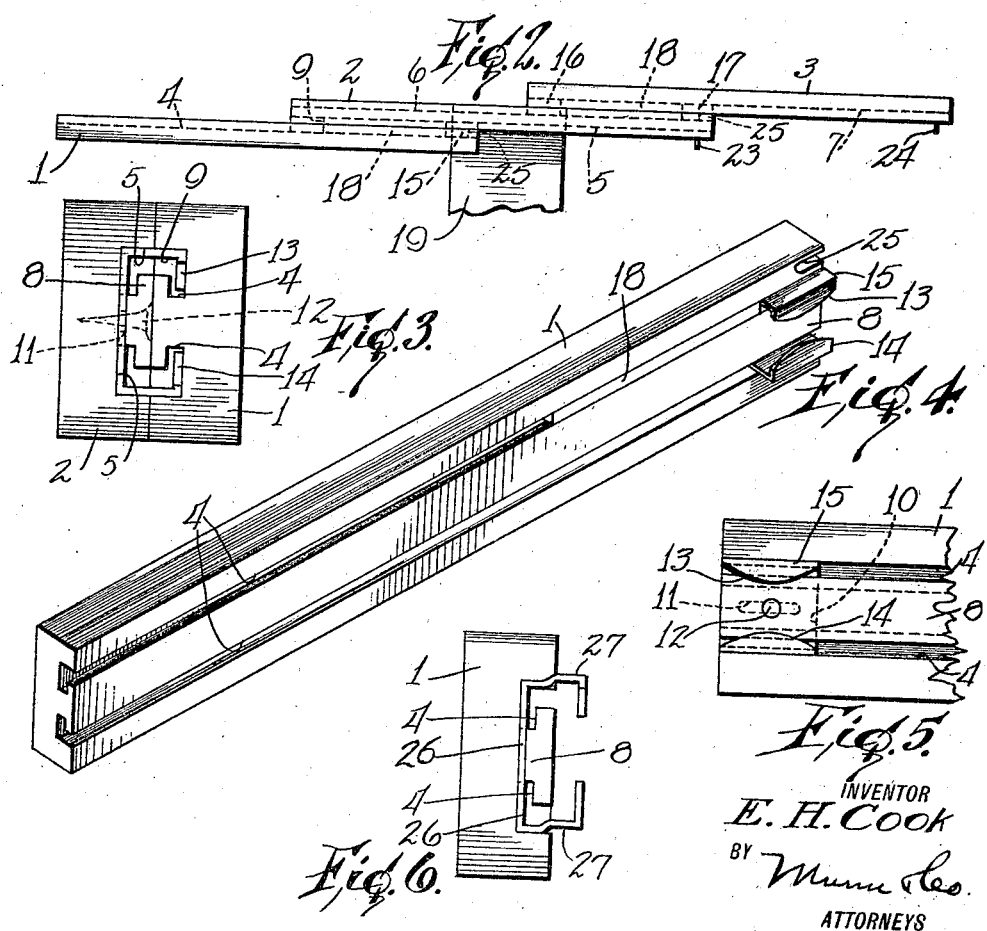
INVENTOR
E. H. Cook
BY
ATTORNEYS Patented May 1, 1923.

1,453,546

UNITED STATES PATENT OFFICE.

EARL H. COOK, OF WATERTOWN, WISCONSIN.

TABLE-SLIDE CONSTRUCTION.

Application filed February 6, 1922. Serial No. 534,511.

*To all whom it may concern:*

Be it known that I, EARL H. COOK, a citizen of the United States, and a resident of Watertown, in the county of Jefferson and State of Wisconsin, have invented a new and useful Improvement in Table-Slide Constructions, of which the following is a full, clear, and exact description.

My invention relates to improvements in table slide constructions for folding tables, and it consists in the combinations, constructions, and arrangements herein described and claimed.

An object of my invention is to provide a table slide construction in which the sliding members have L-grooves so constructed as to provide the maximum amount of supporting surface to the plates connecting the members together.

A further object of my invention is to provide a device of the character described in which the plates securing the sliding members together are secured to the members in a novel way.

A further object of my invention is to provide a device of the character described in which the end sliding members are adapted to be raised slightly so as to prevent the sagging of the ends of the table.

A further object of my invention is to provide a device of the character described which is simple in construction, durable and efficient for the purpose intended, and which is not likely to easily get out of order.

Other objects and advantages will appear in the following specification, and the novel features of the invention will be particularly pointed out in the appended claims.

My invention is illustrated in the accompanying drawings, forming part of this application, in which—

Figure 1 is a side elevation of the device as shown operatively applied to a table, Figure 2 is a plan view of the device, Figure 3 is an end elevation of two of the sliding members, Figure 4 is a perspective view of one of the sliding members, Figure 5 is a side elevation of a connecting plate as shown applied to one of the sliding members, and Figure 6 is a modified form of the connecting plate.

In carrying out my invention, I provide sliding members 1, 2, and 3, each of which are provided with L-shaped grooves therein. The member 1 is provided with L-shaped grooves 4, the member 2 is provided with L-shaped grooves 5 on one of its sides and with grooves 6 on its other side, and the member 3 is provided with grooves 7. In Figure 3, the shape of the grooves is clearly shown, and it will be noted that the grooves define T-shaped portions 8. The member 1 has a connecting plate 15 disposed at one end thereof (see Figures 4 and 5). A slot 10 is cut parallel with the bottom of the grooves 4, and is adapted to receive the plate 15. The plate 15 is provided with a slot 11 therein through which the screw 12 is disposed, the screw being adapted to prevent the withdrawal of the member 15, and at the same time, to permit a slight movement of the member 15 with respect thereto. It is obvious that the slot 10 may be of any desired depth so as to permit movement of the plate 15 with respect to the screw 12. The plate 15 extends to the outer sides of the grooves 4 and is then bent at right angles so as to project laterally from the grooves. The plate 15 is again bent at right angles so as to provide two inwardly projecting lugs 13 and 14 for a purpose hereafter described. The portions of the plate 15 parallel with the outer sides of the grooves 4 are of the same width as the depth of the grooves 4. It will therefore be apparent that the lugs 13 and 14 will abut the inner surfaces of the grooves in the adjacent sliding member. As shown in Figure 3, the sliding member 1 is connected to the sliding member 2 by means of the plate 15, and the lugs 13 and 14 of the plate 15 project inwardly into the L-shaped portions of the grooves 5. The lugs 13 and 14 are curved so as to provide an easy sliding contact between the plate 15 and the grooves 5. It will thus be observed that the member 1 is supported by the maximum of surface of the L-shaped grooves 5, since the outer surfaces of the grooves 5 bear against the plate 15.

As heretofore stated, the member 1 is slidably connected to the member 2 by means of the plate 15. The members 1 and 2 are also connected to each other by means of a plate 9 which is identical to the plate 15. In like manner, the member 2 is connected to the member 3 by plates 16 and 17. The plates 15 and 16 are carried by the members 1 and 3, and the plates 9 and 17 are carried by the member 2. In Figure 2, the members 1, 2, and 3 are shown in extended position and are prevented from any further movement in an outward direction by means of strips 18 (see Figure 4), which are disposed in the grooves 5 and 6, respectively, and abut against the adjacent edges of the plates 9 and 15, and 16 and 17, respectively. The member 2 is rigidly secured to a cross piece 19 of the table, which in turn is carried by a pedestal 20. When the table is made smaller, the leaves 21 are removed from the table and permit the two table sections 22 to be brought together. Movement of the sections 22 toward each other also moves the members 1 and 3 inwardly, since the sections 22 are rigidly secured to the members 1 and 3. It is obvious that two sets of members 1, 2, and 3 are used in each table. The members 1 and 3 are prevented from further movement when the two members are alined with the member 2. As clearly shown in Figures 2 and 4, the members 2 and 3 carry pins 23 and 24 which are adapted to be received in slots 25 which are disposed in the ends of the members 1 and 2.

From the foregoing description of the various parts of the device, the operation thereof may be readily understood. As heretofore stated, the L-shaped grooves in the members are so disposed that the outer walls thereof have the greatest amount of surface with respect to the other walls of the grooves. The connecting plates are adapted to bear against the outer surfaces of the grooves and to thus provide the greatest amount of supporting surface between adjacent members. The connecting plates are readily adjustable with respect to the sliding members, since they are secured to the members by means of screws which are diposed in slots in the connecting members. It will therefore be seen that a fine adjustment may be had between the adjacent sliding members so as to cause them to perfectly aline with each other when they are in closed position.

In Figure 6, I have shown a slightly modified form of the connecting plates. This connecting plate 26 could be used in place of the plates 9 and 17 in the preferred form of the device. As clearly shown in the drawing, the outwardly extending portions of the plate 26 are bent upwardly so as to provide supporting surfaces 27 to the adjacent member which are at a higher elevation than are the outer surfaces of the L-shaped grooves to which the plate 26 is attached. With this construction, it will be apparent that the outer ends of the members 1 and 3 are tilted slightly upwardly with respect to the member 2, since the plates 26, which take the place of the plates 9 and 17, would slightly raise the members 1 and 3 above a horizontal position. In other words, the inner ends of the members 1 and 3 are disposed in the same plane as the member 2, but the outer ends of the members 1 and 3 are raised slightly above the plane of the member 2. The trouble usually caused by the sagging of the members 1 and 3 would therefore be obviated, since the ends of the members 1 and 3 are normally disposed above the plane of the member 2. It will also be observed that a greater weight may be subjected to the ends of the members 1 and 3 without causing the latter to sag below the level of the table, since the members will have to swing or move an appreciable distance before they will pass the position which is horizontal with the plane of the member 2.

From the foregoing, it will be observed that I have provided a simple table slide construction which makes use of the greatest amount of supporting surface between the sliding members. I also provide a connecting plate of novel construction which is adapted to securely connect the adjacent sliding members together and to prevent any lateral movement of the members with respect to each other. It will be seen that the connecting plates prevent any lateral movement between the sliding members, since they abut the outer and bottom sides of the L-shaped grooves. I also provide a means by which the ends of the table are prevented from sagging when slightly worn or when a relatively great weight is placed thereon. As heretofore stated, the device is simple in construction and is efficient for the purpose intended.

I claim:

1. A table slide construction comprising three members having their vertically disposed sides slidably engaging with each other, L-shaped grooves in the abutting surfaces of each slide, the alined grooves of adjacent members forming U-shaped slots, the portions of the slots connecting the arms of the slots being disposed adjacent to the top and bottom of said members and in a horizontal plane, and connecting plates adjustably carried by said members and being adapted to slidably connect said members together, said plates having horizontally disposed sides adapted to slidably engage with the horizontal portions of said grooves, whereby the maximum amount of supporting surface is provided between the members by the connecting plates, the plates connecting the end members to the central member being upwardly offset so as to elevate the outer ends of the end members slightly with respect to the central member.

2. A table comprising a supporting pedestal, two central members carried by said pedestal and having L-shaped grooves in their vertical sides, two sliding members carried by each of said first named members and having L-shaped grooves in alinement with said first named grooves, said alined grooves forming U-shaped bores, the horizontal portions of said bores being disposed adjacent to the top and bottom of said members, certain of said members having slots in the ends thereof, and connecting plates being adjustably disposed in said slots and being adapted to operatively connect said members together, the horizontal sides of said plates engaging with the horizontal space of said bores, whereby the maximum amount of supporting surface is provided between the members by the connecting plates, the end plates being bent upwardly so as to raise the end members slightly, thereby preventing the sagging of said end members.

EARL H. COOK.